(12) United States Patent
Jeong (10) Patent No.: US 9,139,113 B2
(45) Date of Patent: Sep. 22, 2015

(54) ROUND RECLINER FOR VEHICLE SEAT

(75) Inventor: Tae-joo Jeong, Ansan-si (KR)

(73) Assignee: Austem Co., Ltd., Cheonan-si (KR)

( * ) Notice: Subject to any disclaimer, the term of this patent is extended or adjusted under 35 U.S.C. 154(b) by 1000 days.

(21) Appl. No.: 13/266,735

(22) PCT Filed: Jun. 1, 2011

(86) PCT No.: PCT/KR2011/003994
§ 371 (c)(1),
(2), (4) Date: Oct. 27, 2011

(87) PCT Pub. No.: WO2011/152655
PCT Pub. Date: Dec. 8, 2011

(65) Prior Publication Data
US 2012/0186931 A1    Jul. 26, 2012

(30) Foreign Application Priority Data
Jun. 4, 2010    (KR) .......................... 10-2010-0052603

(51) Int. Cl.
*B60N 2/235* (2006.01)
(52) U.S. Cl.
CPC .................................. *B60N 2/2356* (2013.01)
(58) Field of Classification Search
CPC .................................................. B60N 2/2356
USPC ....................................... 192/223.1; 297/367 P
See application file for complete search history.

(56) References Cited

U.S. PATENT DOCUMENTS 6,991,295 B2 *   1/2006   Peters ........................ 297/367 R
2012/0126603 A1 *  5/2012  Peters ........................ 297/367 P

FOREIGN PATENT DOCUMENTS

JP          2002177084 A  *  6/2002
KR       1020040074688 A  *  2/2003

* cited by examiner

*Primary Examiner* — Terry Chau
(74) *Attorney, Agent, or Firm* — Schmeiser, Olsen & Watts LLP (57) ABSTRACT

A round recliner for vehicle seat is disclosed having a holder; a sector gear coupled to the holder to be rotatable with respect to the holder; N lock gears respectively having outer teeth and moving between a locking position where the outer teeth interlock with the inner teeth and an unlocking position where the outer teeth retreat from the inner teeth; and an operating means for moving the N lock gears to the locking or unlocking positions. The holder has N lock gear guides which guide each lock gear to slide between the locking and unlocking positions, an N−1 lock gear guides to make its outer teeth fully interlock with the inner teeth of the sector gear, and the remaining 1 lock gear guide has its guide round surface to make only one side tooth surfaces of its outer teeth interlock with the inner teeth of the sector gear.

10 Claims, 6 Drawing Sheets

ROUND RECLINER FOR VEHICLE SEAT

TECHNICAL FIELD

The present invention relates to a round recliner for a vehicle seat and more particularly to a round recliner for a vehicle seat having a holder and a sector gear which are coupled together to be rotatable therebetween, N lock gears which allow locking and unlocking of the sector gear with respect to the holder and an operating means of the lock gears.

BACKGROUND ART

A recliner is a device installed in a seat, especially in a vehicle seat, to adjust a rotation angle of a seatback with respect to a seat cushion.

Especially, a round recliner, which is much related to the present invention, comprises a holder which is fixed to the seat, a sector gear which is fixed to the seatback and rotatably coupled to the holder, a plurality of lock gears which are accommodated in an inner space formed by the holder and the sector gear to slide in an overall circular direction according to a rotating operation of the cam thus performing locking and unlocking of the sector gear with respect to the holder.

Exemplary conventional inventions for such a round recliner include Korean Patent Registration No. 513576 "ROUND RECLINER FOR VEHICLE" (registered on Sep. 1, 2005), Korean Patent Registration No. 575397 "RECLINER FOR VEHICLE" (registered on Apr. 25, 2006), Korean Patent Registration No. 575398 "RECLINER FOR VEHICLE" (registered on Apr. 25, 2006) and etc.

Figure 1:
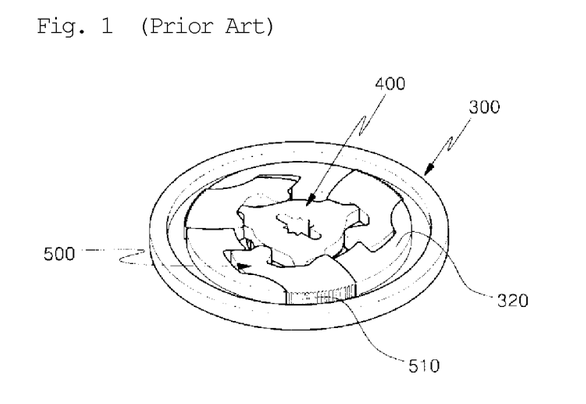
FIG. 1 is a perspective view of a principal part of a conventional round recliner for vehicle seat.

FIG. 1 is a schematic view of a recliner which shows typical characteristics of the conventional inventions.

In FIG. 1, a lock gear 500 slides along a lock gear guide of a holder 300 so that teeth 510 of an outer round surface of the lock gear 500 interlock with inner teeth (not shown) of a sector gear (not shown).

According to such a conventional round recliner, a lock gear guide 320 and the lock gear 500 have an operating clearance to a predetermined amount for a smooth sliding movement therebetween.

However, due to existence of such operating clearance, rotational clearance is generated as much as the operating clearance between the lock gear 500 and the lock gear guide 320 even when the sector gear (not shown) is locked with respect to the holder 300, so that rattling of the seatback is generated.

Also, there are three lock gears 500 for locking the sector gear (not shown) according to the conventional round recliner as described above.

However, according to experiments, substantially only one lock gear 500 exerts locking force in most cases when there is an outer rotational impact on the sector gear, which may cause safety problem that the sector gear in a locking state can rotate freely due to deformation of teeth 510 if an outer impact of a significant amount is exerted.

DISCLOSURE

Technical Problem

Accordingly, an object of the present invention is to provide a round recliner for vehicle seat which can prevent a seatback from rattling and endure a significant outer impact even if there is operating clearance between lock gears and lock gear guides.

Technical Solution

In order to accomplish the above object, the present invention provides a round recliner for vehicle seat comprising a holder; a sector gear coupled to the holder to be rotatable with respect to the holder around an operating shaft, which is inserted into the holder and the sector gear together, and having a gear rim which has inner teeth along an inner round surface thereof; N lock gears respectively having outer teeth at an outer round surface thereof which have the same circular pitch as the inner teeth and moving between a locking position where the outer teeth interlock with the inner teeth to prevent the sector gear from rotating with respect to the holder and an unlocking position where the outer teeth retreat from the inner teeth to allow the sector gear to rotate with respect to the holder; and an operating means for moving the N lock gears to the locking position or the unlocking position according to rotating operation through the operating shaft, wherein the holder has N lock gear guides which protrude from a surface to face the sector gear and guide each lock gear to slide along a guide round surface having a predetermined rotation center thus sliding between the locking position and the unlocking position with a predetermined operating clearance, and among the N lock gear guides, N−1 lock gear guides have the guide round surface which has its rotation center for the lock gear guided by the guide round surface to make its outer teeth fully interlock with the inner teeth of the sector gear when the lock gear has slid to the locking position, and 1 lock gear guide has its guide round surface which has a displaced rotation center for the lock gear guided by the guide round surface to make only one side tooth surfaces of its outer teeth interlock with the inner teeth of the sector gear when the lock gear has slid to the locking position.

According to an aspect of the present invention, the rotation centers of the guide round surfaces of the N−1 lock gear guides are located at predetermined positions with a predetermined radius from the operating shaft and with a predetermined circular interval of 360/N around the operating shaft, and the rotation center of the guide round surface of the 1 lock gear guide is located at a displaced position which is displaced with a predetermined distance from remaining one of the predetermined positions of the predetermined radius and the predetermined circular interval in a tangential direction at a common center of the outer teeth of the 1 lock gear and the inner teeth of the sector gear intermeshing therebetween.

According to an aspect of the present invention, the rotation centers of the guide round surfaces of the N−1 lock gear guides are located at predetermined positions with a predetermined radius from the operating shaft and with a predetermined circular interval of 360/N around the operating shaft, and the rotation center of the guide round surface of the 1 lock gear guide is located at a displaced position which is displaced with a predetermined distance from remaining one of the predetermined positions of the predetermined radius and the predetermined circular interval in a circular direction.

According to an aspect of the present invention, a displacement of the rotation center of the guide round surface of the 1 lock gear guide is bigger than the operating clearance between the guide round surface of the 1 lock gear guide and the lock gear guided to slide along the guide round surface.

According to an aspect of the present invention, a displacement of the rotation center of the guide round surface of the 1 lock gear guide is equal to or smaller than a circular pitch between the inner teeth of the sector gear.

According to an aspect of the present invention, the holder has a cam receiving part formed at an inner side of the N lock gear guides, which are disposed at a distance therebetween in a circular direction, and N spring receiving parts formed between the N lock gear guides, and the operating means has a cam which is received in the cam receiving part and rotates integrally with the operating shaft to press and move the N lock gear guides to the locking position or the unlocking position, and N springs which are received in the N spring receiving parts and each of which is supported by the holder through an inner end thereof and presses the cam to rotate through an outer end thereof.

According to an aspect of the present invention, N spring receiving parts have back surfaces which protrude to an outer surface of the holder to form N embossments.

According to an aspect of the present invention, thickness of the N lock gear guides is smaller than the thickness of the N lock gears guided to slide by the N lock gear guides.

Advantageous Effects

According to the round recliner for vehicle seat of the present invention as described above, when N−1 lock gear guides from N lock gear guides allow lock gears guided thereby to fully interlock with inner teeth of a sector gear, the remaining 1 lock gear guide allows only one side tooth surface of a lock gear guided thereby to interlock with the inner teeth of the sector gear, so that a rattling which was generated due to operating clearance between the N lock gear guides and the lock gears when the sector gear and the lock gear interlocked to each other can be prevented.

Also, when there is locking between the lock gears and the sector gear, N−1 lock gears from the N lock gears fully interlock with the sector gear and the remaining 1 lock gear interlocks about in half with the sector gear.

Therefore, overall N−1+0.5, that is, N−0.5 lock gears exert locking force to the sector gear, so that a high strength recliner with enhanced safety that can endure a significant outer force can be accomplished.

BEST MODE

Figure 2:
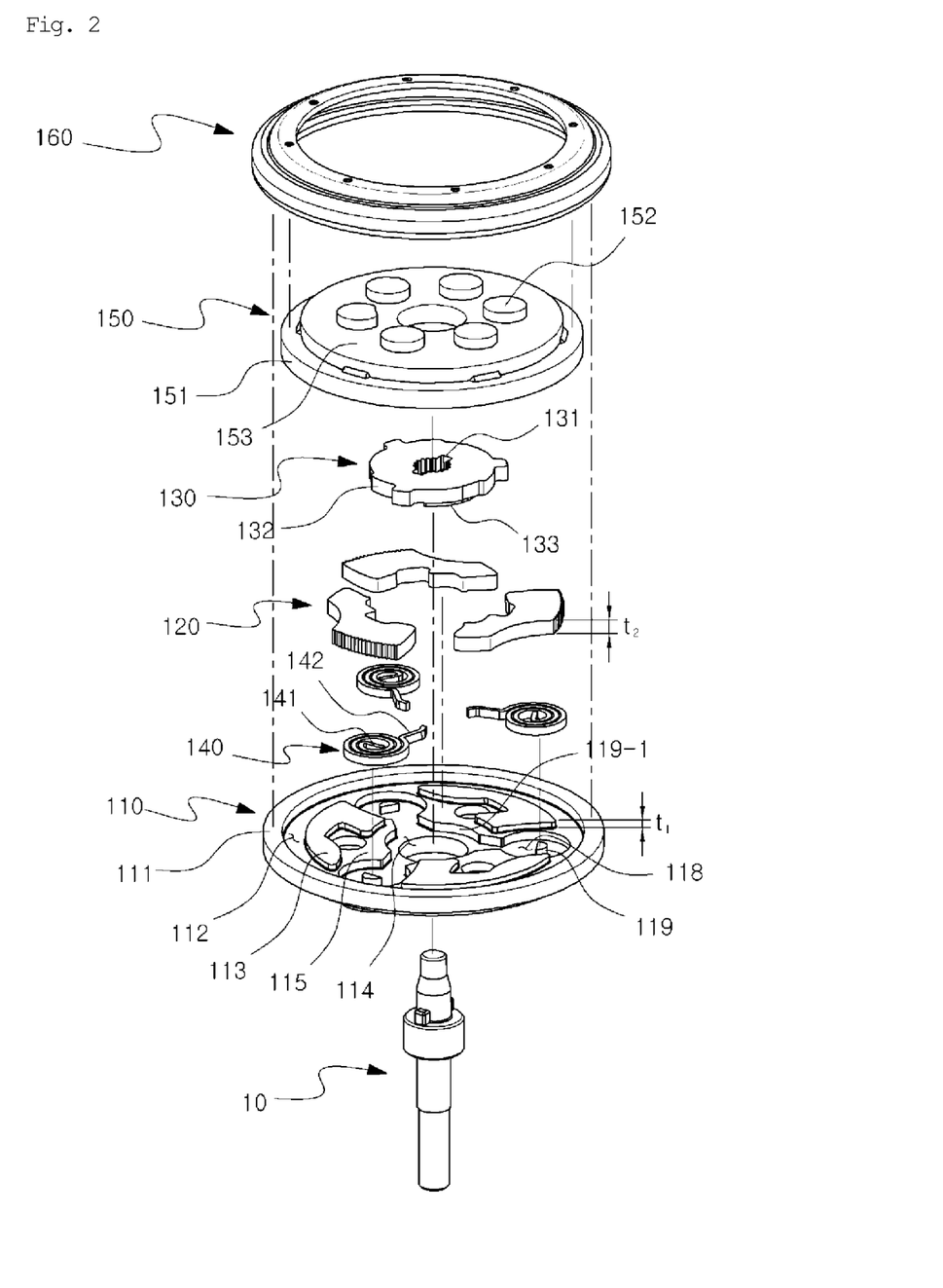
FIG. 2 and FIG. 3 are exploded upper and lower views of a round recliner for vehicle seat according to an exemplary embodiment of the present invention.
Figure 3:
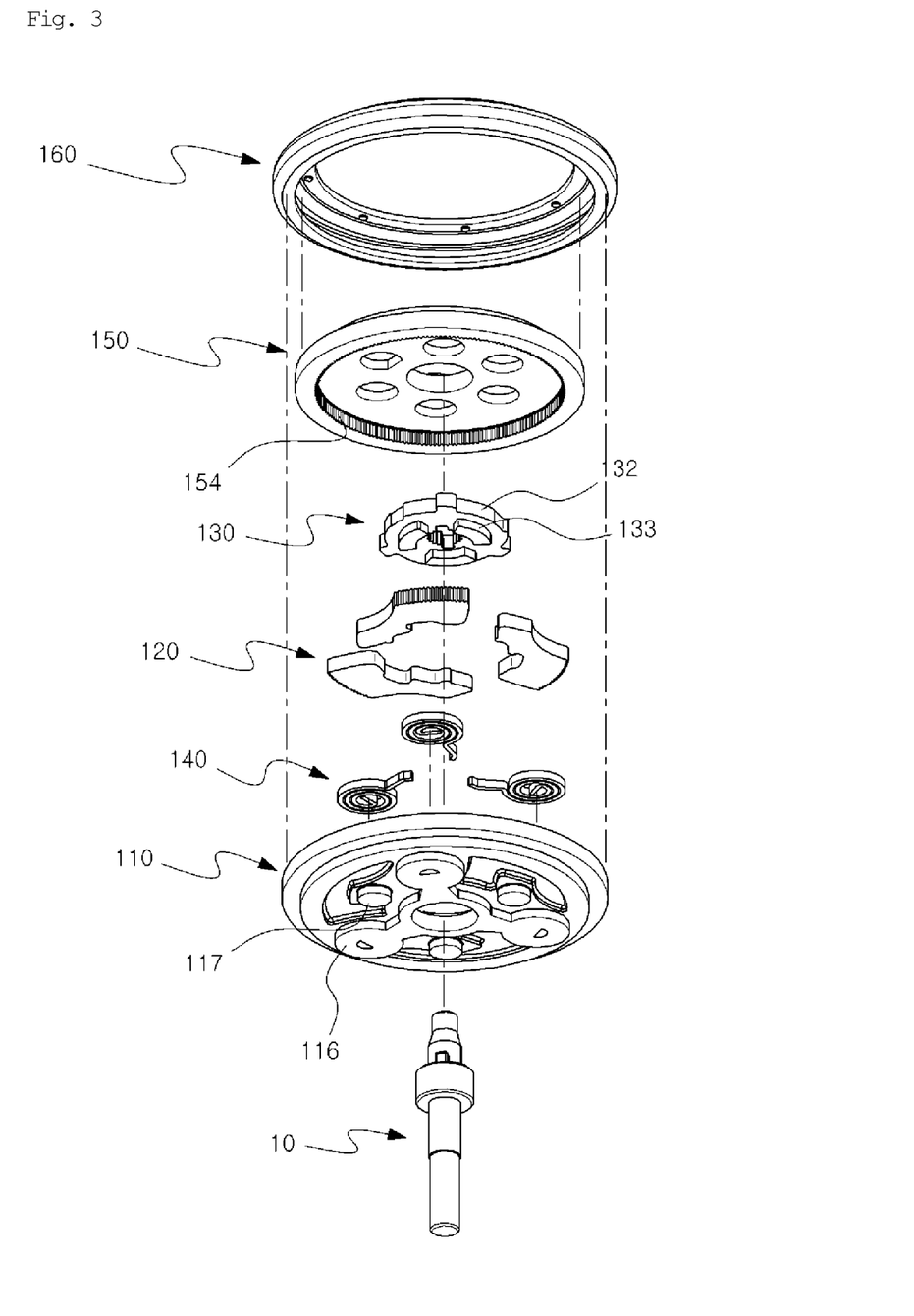

As shown in FIG. 2 and FIG. 3, a round recliner for vehicle seat according to an exemplary embodiment of the present invention comprises a holder 110 and a sector gear 150 which are coupled up and down, and three lock gears 120, cam 130 and three springs 140 which are accommodated and supported between the holder 110 and the sector gear 150.

The holder 110 has a support rim 111 which is formed on an outer circular part thereof and a gear rim receiving part 112 which is at an inner side of the support rim 111.

As will be described later, a gear rim 151 of the sector gear 150 is received in the gear rim receiving part 112 to contact and rotate.

The support rim 111 supports an outer surface of the gear rim 151.

Three lock gear guides 113 are formed at an inside of the gear rim receiving part 112 at a predetermined interval therebetween in a circular direction.

Each lock gear guide 113 guides corresponding lock gear 120 to slide when locking and unlocking.

A cam receiving part 114 is formed at an inside of the lock gear guides 113 to receive and support the cam 130.

The lock gears 120 are accommodated in the holder 110 and loaded on the same floor surface 115 as the lock gear guides 113.

While guided by the lock gear guides 113, the lock gears 120 slide between a locking position (refer to FIG. 5) where their interlock with the sector gear 150 is made and an unlocking position where the interlock is released.

The cam 130 is accommodated in the cam receiving part 114 of the holder 110 to be rotatably supported.

The cam 130 is integrally rotated with an operating shaft 10 through a shaft coupling hole 131 formed at a center part thereof.

Figure 5:
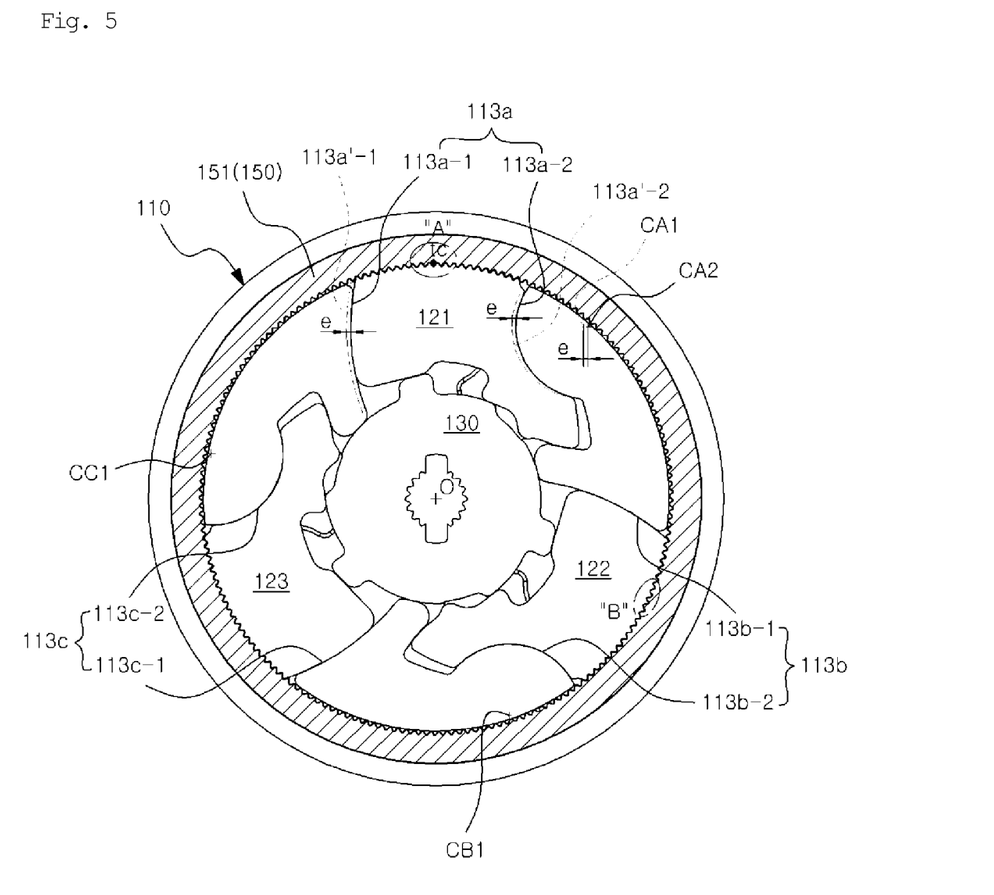
FIG. 5 is a plan view for describing operation of the round recliner for vehicle seat of FIG. 2.

When the cam 130 is driven to rotate, the lock gears 120 are pressed to slide from the locking position of FIG. 5 to the unlocking position.

On the contrary, in an unlocking state of the lock gears 120, the lock gears 120 slide back to the locking position of FIG. 5 due to a reverse rotation of the cam 130.

The holder 110 has a plurality of first embossments 116 and second embossments 117, which protrude to an outside (i.e. lower side), at a predetermined interval therebetween in the circular direction respectively.

the embossments 116 and 117 are inserted into coupling holes (not shown) provided to a seat cushion (not shown) for the holder 110 to be fixed to the seat cushion.

Also, the holder 110 has a plurality of spring receiving parts 118 formed between the 3 lock gear guides 113.

A back surface of each spring receiving part 118 is formed to correspond to the first embossment 116.

That is, the spring receiving parts 118 and the first embossments 116 which are integrally formed therebetween enable a function of receiving the spring 140 and a function of supporting the holder 110 at the same time.

Each spring receiving part 118 receives the spring 140.

An inner end 141 of the spring 140 is supported by a supporting protrusion 119 formed at a center of the spring receiving part 118, and an outer end 142 of the spring 140 is elongated to the cam receiving part 114 to elastically 15 press the cam 130 in a circular direction.

Although, according to the conventional round recliner described above, a spring to rotate the cam was disposed on upper or lower side of the cam so that an overall thickness of the recliner was designed to be increased.

However, according to this exemplary embodiment of the present invention, the overall thickness of the recliner can be reduced by forming the spring receiving part 118 described above.

Also, conventionally, only a single spring was designed to rotate the cam so that size of the spring especially the thickness of the spring was increased, which made the thickness of the recliner increased.

However, according to this exemplary embodiment of the present invention, a plurality of springs 140 share an elastic force needed to rotate the cam 130 so that the size of the spring 140 can be formed smaller, which makes the thickness of the recliner reduced in comparison with that of the conventional recliner.

At the same time, cam guide parts 119-1 are formed at the cam receiving part 114 of the holder 110 to make the same floor with the spring receiving parts 118.

Correspondingly, the cam 130 has a body part 132 to interact with the lock gears 120 and three operating protrusions 133 to interact with the springs 140.

The operating protrusions 133 are formed on a lower surface of the body part 132 with a predetermined interval therebetween in a circular direction to be received and rotatably supported by the cam guide parts 119-1.

Each operating protrusion 133 is pressed to rotate by the outer end 142 of each spring 140.

The sector gear 150 has a plurality of coupling protrusions 152 which are formed to protrude from an outer surface (that is, upper surface) and disposed with a predetermined interval therebetween in a circular direction.

The plurality of coupling protrusions 152 are inserted and coupled to fixing holes (not shown) provided to the seatback (not shown) for the sector gear 150 to be fixed to the seatback.

Figure 4:
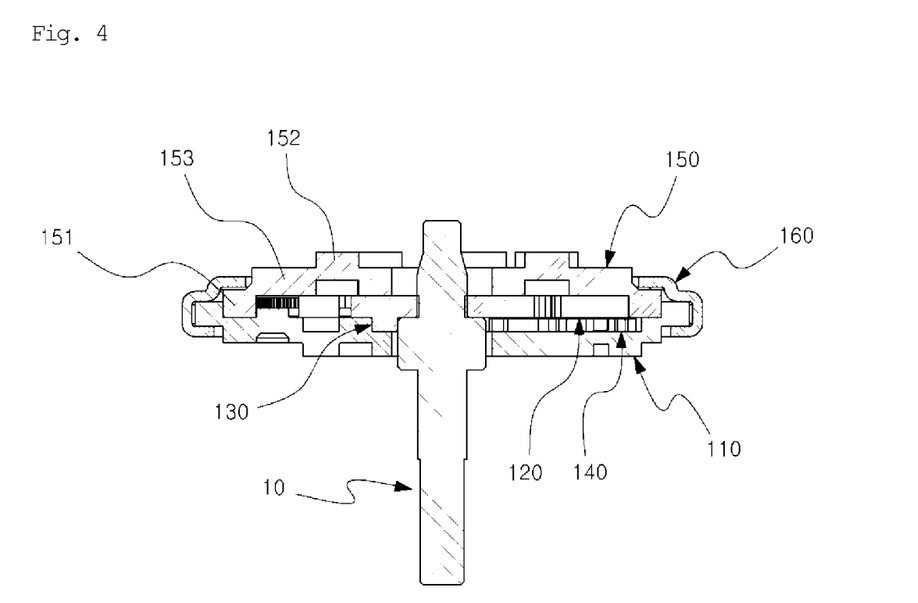
FIG. 4 is a sectional view of an assembled state of the round recliner for vehicle seat of FIG. 2.

Referring to FIG. 2 to FIG. 4, as a factor to determine the thickness of the sector gear 150, there are the gear rim 151 as a first sector gear layer, a cover part 153 formed at an inside of the gear rim 151 as a second sector gear layer to cover the plurality of lock gears 120, the cam 130 and etc. and finally the plurality of coupling protrusions 152 formed on an upper surface of the cover part 153 as a third sector gear layer.

That is, the thickness of the sector gear 150 corresponds to a length from a lower end surface of the first sector gear layer to an upper end surface of the third sector gear layer.

According to the conventional round recliner, the sector gear required an additional sector gear layer to accommodate the spring that is provided on an upper surface of the cam.

However, according to this exemplary embodiment of the present invention, such an additional sector gear layer is not needed so that the thickness of the sector gear 150 itself can be reduced in comparison with the conventional art.

Referring to FIG. 5, three lock gear guides 113a, 113b and 113c have an operating clearance of a small amount with the corresponding lock gears 121, 122 and 123 for a smooth slide guide of the lock gears.

In this case, as for a rotation center of an arc which each lock gear guide makes, the rotation center of guide round surfaces 113a-1 and 113a-2 is CA2, the rotation center of guide round surface 113b-1 and 113b-2 is CB1 and the rotation center of guide round surface 113c-1 and 113c-2 is CC1.

The rotation centers CB1 and CC1 have the same radius from a rotation center O of the recliner and make an angle of 120 degrees therebetween.

Then, to correspond to the rotation center CB1 and CC1, the rotation center of the first lock gear guide 113a should be not CA2 but CA1.

That is, as in the conventional art, the original rotation center CA1 has the same radius with the other rotation centers CB1 and CC1 and makes the angle of 120 degree with CB1 and CC1 therebetween.

To make CA1 the rotation center, the guide round surfaces of the first lock gear guide 121 according to the conventional art are 113a'-1 and 113a'-2 which can be seen as dotted lines in FIG. 5.

However, according to this exemplary embodiment of the present invention, the rotation center CA2 of the guide round surfaces 113a-1 and 113a-2 of the first lock gear guide 113a offsets to the right with a predetermined distance e from the above original rotation center CA1.

Accordingly, the guide round surface 113a-1 and 113a-2 offset to the right with the distance e from the original guide round surfaces 113a'-1 and 113a'-2, too.

Figure 6:
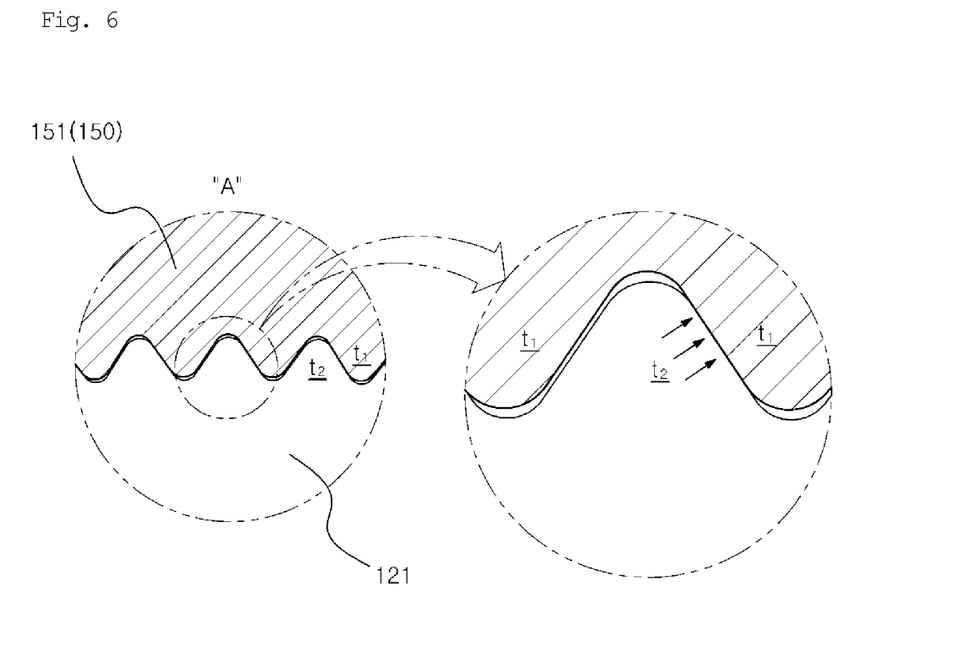
FIG. 6 is an expanded view of area A in FIG. 5.

According to the first lock gear guide 113a which has such an offset rotation center CA2, as shown in FIG. 6, the outer teeth t2 of the first lock gear 121 at its locking position offset to the right, so that only right side tooth surfaces of the outer teeth t2 interlock with the inner teeth t1 of the gear rim 151 of the sector gear 150.

Figure 7:
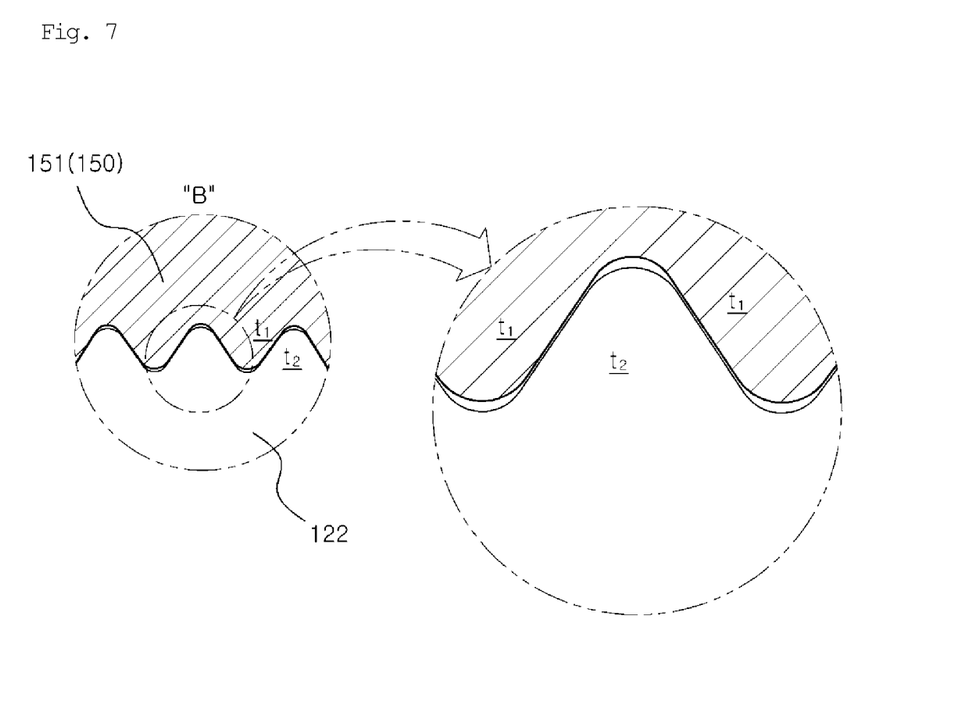
FIG. 7 is an expanded view of area B in FIG. 5.

On the contrary, the second lock gear 122 and the third lock gear 123 of FIG. 5 have their outer teeth t2 to fully interlock with the gear rim 151 of sector gear 150 as seen in FIG. 7.

According to the lock gears 121, 122 and 123 which have interlocking relations as described above, the sector gear 150 in the locking state receives a thrust force in the upper and right direction as indicated as arrows in FIG. 6 due to the interlock with the first lock gear 121 as seen in FIG. 6.

As a reaction force, the first lock gear 121 receives the same amount of the thrust force in the lower and left direction from the sector gear 150, so that the left guide round surface 113a-1 of the first lock gear guide 113a is contacted and pressed by the first lock gear 121.

Due to such an interaction, the operating clearance between the first lock gear 121 and the first lock gear guide 113a can be removed.

Consequently, as the rotation center CA2 of the guide round surfaces 113a-1 and 113a-2 of the first lock gear guide 113a offsets from the original rotation center CA1, the other two lock gears 122 and 123 can maintain a full interlock with the sector gear 150.

Of course, the first lock gear 121 can maintain about a half interlock with the sector gear 150, so that an interlock by overall 2+½ lock gears 120, that is, 2.5 lock gears 120 can be accomplished.

In this case, it is preferable that the offset e of the rotation center CA2 be set to be bigger than the operating clearance between the guide round surfaces 113a-1 and 113a-2 of the first lock gear guide 113a and the first lock gear 121 guided to slide along the guide round surfaces 113a-1 and 113a-2.

It is also preferable that the offset e of the rotation center CA2 is equal to or smaller than a circular pitch between the inner teeth t1 of the sector gear 150.

In FIG. 5, the rotation center CA2 of the guide round surfaces 113a-1 and 113a-2 of the first lock gear guide 113a offsets to the right from the original rotation center CA1.

To be more specific, the direction of the offset is parallel to a tangential direction at a center point tc of the teeth of the first lock gear 121 interlocking with the sector gear 150.

Although, in this exemplary embodiment, the rotation center CA2 is described to offset horizontally from the original rotation center CA1, the present invention is not limited to this embodiment.

For example, the rotation center of the guide round surfaces of the first lock gear guide 113a may be located at a position which is displaced with an amount of a minute angle in the circular direction from the original rotation center CA1.

Also, in this exemplary embodiment, three lock gears 120 and three lock gear guides 113 are described to be provided.

However, the present invention is not limited to the number of the lock gears 120 and the lock gear guides 113, which may also be provided two, four or etc. with the same application described above.

Moreover, the round recliner 100 for vehicle seat according to the exemplary embodiment of the present invention, as shown in FIG. 1, is characterized in that a protruding thickness t1 of the lock gear guide 113 of the holder 110 to guide the lock gear 120 is smaller than the thickness t2 of the lock gear 120.

According to the conventional art where the thickness of the lock gear is the same as that of the lock gear guide, if there is a forward or backward impact through the sector gear in the locking state where the lock gear interlocks with the inner teeth of the sector gear, the lock gear slides along the lock gear guide in a direction where the locking is released thus making a locking release state and causing a free rotation of the seatback.

On the contrary, according to the present invention where the protruding thickness t1 of the lock gear guide 113 is smaller than the thickness t2 of the lock gear 120, when there is a forward or backward impact through the sector gear 150 in the locking state between the lock gear 120 and the sector gear 150, the lock gear 120 does not slide along the lock gear guide 113 due to the impact.

Instead, the lock gear guide 113 is deformed in the circular direction due to the pressure of the lock gear 120 receiving the rotational force from the sector gear 150, so that the locking state between the lock gear 120 and the sector gear 150 can be maintained.

Therefore, the free rotation of the seatback can be prevented.

In short, according to the present invention, the lock gear guide 113 of the holder 110 is induced to be deformed when there is a considerable outer impact, so that injury on the passenger due to the rotation of the seatback can be prevented.

Although the exemplary embodiment of the present invention has been disclosed, various modifications, additions and substitutions are possible, without departing from the scope and spirit of the invention. Therefore, the above embodiment must be regarded as one example provided for description of the present invention, rather than to limit the present invention.

The invention claimed is:

1. A round recliner for vehicle seat comprising a holder; a sector gear coupled to the holder to be rotatable with respect to the holder around an operating shaft, which is inserted into the holder and the sector gear together, and having a gear rim which has inner teeth along an inner round surface thereof; N lock gears respectively having outer teeth at an outer round surface thereof which have the same circular pitch as the inner teeth and moving between a locking position where the outer teeth interlock with the inner teeth to prevent the sector gear from rotating with respect to the holder and an unlocking position where the outer teeth retreat from the inner teeth to allow the sector gear to rotate with respect to the holder; and an operating means for moving the N lock gears to the locking position or the unlocking position according to rotating operation through the operating shaft, wherein the holder has N lock gear guides which protrude from a surface to face the sector gear and guide each lock gear to slide along a guide round surface having a predetermined rotation center thus sliding between the locking position and the unlocking position with a predetermined operating clearance, and among the N lock gear guides, N−1 lock gear guides have the guide round surface which has its rotation center for the lock gear guided by the guide round surface to make its outer teeth fully interlock with the inner teeth of the sector gear when the lock gear has slid to the locking position, and 1 lock gear guide has its guide round surface which has a displaced rotation center for the lock gear guided by the guide round surface to make only one side tooth surfaces of its outer teeth interlock with the inner teeth of the sector gear when the lock gear has slid to the locking position.

2. The round recliner for vehicle seat according to claim 1, wherein the rotation centers of the guide round surfaces of the N−1 lock gear guides are located at predetermined positions with a predetermined radius from the operating shaft and with a predetermined circular interval of 360/N around the operating shaft, and the rotation center of the guide round surface of the 1 lock gear guide is located at a displaced position which is displaced with a predetermined distance from remaining one of the predetermined positions of the predetermined radius and the predetermined circular interval in a tangential direction at a common center of the outer teeth of the 1 lock gear and the inner teeth of the sector gear intermeshing therebetween.

3. The round recliner for vehicle seat according to claim 2, wherein a displacement of the rotation center of the guide round surface of the 1 lock gear guide is bigger than the operating clearance between the guide round surface of the 1 lock gear guide and the lock gear guided to slide along the guide round surface.

4. The round recliner for vehicle seat according to claim 2, wherein a displacement of the rotation center of the guide round surface of the 1 lock gear guide is equal to or smaller than a circular pitch between the inner teeth of the sector gear.

5. The round recliner for vehicle seat according to claim 1, wherein the rotation centers of the guide round surfaces of the N−1 lock gear guides are located at predetermined positions with a predetermined radius from the operating shaft and with a predetermined circular interval of 360/N around the operating shaft, and the rotation center of the guide round surface of the 1 lock gear guide is located at a displaced position which is displaced with a predetermined distance from remaining one of the predetermined positions of the predetermined radius and the predetermined circular interval in a circular direction.

6. The round recliner for vehicle seat according to claim 5, wherein a displacement of the rotation center of the guide round surface of the 1 lock gear guide is bigger than the operating clearance between the guide round surface of the 1 lock gear guide and the lock gear guided to slide along the guide round surface.

7. The round recliner for vehicle seat according to claim 3, wherein a displacement of the rotation center of the guide round surface of the 1 lock gear guide is equal to or smaller than a circular pitch between the inner teeth of the sector gear.

8. The round recliner for vehicle seat according to claim 1, wherein the holder has a cam receiving part formed at an inner side of the N lock gear guides, which are disposed at a distance therebetween in a circular direction, and N spring receiving parts formed between the N lock gear guides, and the operating means has a cam which is received in the cam receiving part and rotates integrally with the operating shaft to press and move the N lock gear guides to the locking position or the unlocking position, and N springs which are received in the N spring receiving parts and each of which is supported by the holder through an inner end thereof and presses the cam to rotate through an outer end thereof.

9. The round recliner for vehicle seat according to claim 8, wherein N spring receiving parts have back surfaces which protrude to an outer surface of the holder to form N embossments.

10. The round recliner for vehicle seat according to claim 1, wherein thickness of the N lock gear guides is smaller than the thickness of the N lock gears guided to slide by the N lock gear guides.

* * * * *